United States Patent [19]

Wristers, deceased et al.

[11] 4,272,404

[45] Jun. 9, 1981

[54] SUPPORTED ZIEGLER CATALYSTS AND METHOD THEREFOR

[76] Inventor: Harry J. Wristers, 215 Post Oak, Baytown, Tex. 77520

[75] Inventor: Harry J. Wristers, deceased, late of Baytown, Tex.; by Joy K. Wristers, sole beneficiary, Baytown, Tex.

[73] Assignee: Exxon Research & Engineering Co., Florham Park, N.J.

[21] Appl. No.: 56,175

[22] Filed: Jul. 10, 1979

Related U.S. Application Data

[63] Continuation-in-part of Ser. No. 858,999, Dec. 9, 1977, abandoned, which is a continuation of Ser. No. 659,808, Feb. 20, 1976, abandoned, which is a continuation-in-part of Ser. No. 523,354, Nov. 13, 1974, Pat. No. 3,990,993.

[51] Int. Cl.³ .......................... C08F 4/62; C08F 4/64
[52] U.S. Cl. ................................. 252/429 B; 526/144
[58] Field of Search ..................... 252/428, 429 B, 430

[56] References Cited

U.S. PATENT DOCUMENTS

| | | | |
|---|---|---|---|
| 3,094,568 | 6/1963 | Hay et al. | 252/429 B X |
| 3,594,330 | 7/1971 | Delbouille et al. | 252/429 A |
| 3,838,064 | 9/1974 | Vogt et al. | 252/430 X |
| 3,990,993 | 11/1976 | Wristers | 252/429 B |
| 4,098,979 | 7/1978 | Maemoto et al. | 252/429 B X |

FOREIGN PATENT DOCUMENTS

| | | |
|---|---|---|
| 805264 | 9/1973 | Belgium. |
| 2230672 | 12/1972 | Fed. Rep. of Germany. |
| 2230728 | 12/1972 | Fed. Rep. of Germany. |
| 2230752 | 12/1972 | Fed. Rep. of Germany. |
| 2235033 | 2/1973 | Fed. Rep. of Germany. |
| 47-35076 | 9/1972 | Japan. |

*Primary Examiner*—Patrick Garvin
*Attorney, Agent, or Firm*—D. Roth; M. B. Kurtzman

[57] ABSTRACT

Large particle size polyolefin is obtained by polymerizing mono-olefins in the presence of a supported olefin catalyst which has been ball milled in the presence of small quantities of polytetrafluoroethylene (PTFE) powder in order to trap, i.e., entangle, the supported catalyst in a web of PTFE submicroscopic fibers.

24 Claims, No Drawings

SUPPORTED ZIEGLER CATALYSTS AND METHOD THEREFOR

CROSS REFERENCE TO RELATED APPLICATIONS

This application is a Continuation-in-Part of application Ser. No. 858,999 filed Dec. 9, 1977 and now abandoned, which is a continuation of application Ser. No. 659,808, filed Feb. 20, 1976, and now abandoned, which is a continuation-in-part of Ser. No. 523,354, filed Nov. 13, 1974, and now U.S. Pat. No. 3,990,993.

BACKGROUND OF THE INVENTION

1. Problem to Which Invention is Directed

Polymerization catalysts especially olefin polymerization catalysts (Ziegler) generally are of a wide particle size distribution which particles generally include a great many fines. It is known that the catalyst particles provide "templates" for the formation of polymer particles; the catalyst particles themselves must be the same shape as the desired final polymer powder shape, desirably with a relatively narrow particle size distribution. Conventional high molecular weight polymer powders made with usual catalysts generally include polymer fines. The polymer fines cause the polymer powder to be very difficult to handle. A technique that would increase the particle size of catalysts particles thereby substantially eliminating the catalyst particle fines would be highly desirable. In order to obtain larger powder particles, e.g., greater than about 75 microns, the catalyst particles themselves should possess a mean particle diameter of at least 10, preferably at least 20 and most preferably at least 35 microns.

2. Discussion of the Prior Art

The stereo-specific polymerization of α-olefins such as propylene is well known in the art. Polypropylene resin has become a well-established plastic in the world market. Polypropylene powder sales are also increasing rapidly and, at the present time, are increasing more rapidly than sales of polypropylene pellets. The popularity of the polypropylene powder derives, at least in part, from the rapidly expanding use of filled grades of polypropylene, particularly glass- or talc-filled grades. Additionally, energy savings accrued by the polypropylene manufacturer, by eliminating the extrusion step required in pelletizing are significant.

Most customers demand that polypropylene powder provide all of the resin quality normally obtainable in pelletized products and, in addition, that the powder possess the qualities of good flowability, low fines content, and no "clods", i.e., large aggregates of particles. A reasonably high bulk density is also desirable.

The particle size distribution of catalysts can be made narrower by controlled growth of catalyst particles. Polyolefin particle size distribution can be made narrower by agglomeration and compaction of polymer particles. Adhesive binders have been used in this latter technique; however, adhesives do not function well in catalyst compaction since they poison the active sites of the catalyst.

No prior art is known to the inventor that embodies the concept disclosed here for eliminating catalyst fines. Although a Harshaw publication entitled "Harshaw's Dustless Process" describes a technique of eliminating dust from inert powders, Harshaw has no contemplation for using the process to obtain catalyst particle agglomerates of increased particle size which can be employed as polymerization catalysts for the direct production of large size polymer particles.

Harshaw Chemical has also issued U.S. Pat. No. 3,838,092 and U.S. Pat. No. 3,838,064 which disclose and claim the generalized concept of using the polytetrafluoroethylene as an agglomeration technique. But, the art has no concept or contemplation of utilizing these techniques to overcome the rather special and unique problem of Ziegler catalyst particles as outlined in the parent application.

BRIEF SUMMARY OF THE INVENTION

In its most preferred aspect, the invention involves working small quantities of PTFE powder with supported catalyst component in order to increase the overall effective size of the catalysts or catalysts components which catalyst in accordance with this invention will provide a polymer absent fines and especially a polymer of increased particle size. Preferably the catalyst comprises a supported Ziegler titanium halide catalyst component, e.g., supported $TiCl_3$ and a co-catalyst such as an aluminum alkyl (halide). Such catalysts components generally contain fines, e.g., 10 microns in mean particle diameter or smaller. In accordance with this invention the supported catalytically active particle will have a particle more than 10 microns in mean particle diameter consisting of a plurality of supported $TiCl_3$ catalytic particles in a web of submicroscopic fibers of PTFE. The catalyst can be usefully employed to directly produce polymers having a particle size larger than 75 and preferably larger than 100 microns.

DETAILED DESCRIPTION OF THE INVENTION WITH PREFERRED EMBODIMENTS

In the previous application Ser. No. 523,354 and now U.S. Pat. No. 3,990,993, there was described:

A Ziegler catalyst having a narrow particle size distribution can be produced, but the product, especially from a ball milling step, has many very tiny catalyst fines or particles, e.g., less than 1 micron up to 20 microns usually 10 microns or less of mean particle diameter.

Such a catalyst product can be sieved to increase the mean particle diameter by separating the larger particles from the smaller but since there is no utility for the discarded fines, this approach has not heretofore been attractive. The present invention allows for the production of large size supported catalyst components by working the larger and smaller particles generally obtained in convention supported titanium halide catalyst components together with small quantities of PTFE to eliminate substantially all catalyst fines having a mean particle diameter of 10 microns or less. Depending on the length of time the catalyst component is worked with the PTFE the catalyst can be produced with an overall increase in particle size or with an increase in particle size and a reduction in the particle size distribution of the catalyst component.

That application described a process whereby a Ziegler-type catalyst or larger particle size (e.g., more than 10 up to 1,000, preferably 20 to 200 microns, most preferably 20 to 50 microns, average mean particle diameter) can be produced, which can consist of particles having a relatively narrow particle size distribution.

The generalized problem of the lack of desired particle size uniformity that is obtained when one ball-mills a Ziegler catalyst was described in detail in the parent application. The detailed discussion and the specific examples were directed primarily to a situation in which the Ziegler catalyst was a cocrystallized $TiCl_3$ with aluminum chloride which had been activated by extensive ballmilling.

Another species of Ziegler catalyst which was not extensively discussed in the parent application is that which is referred to for convenience as a supported catalyst. For the purpose of this application, the term "supported catalyst" includes materials in which the support shape is predetermined in advance and the active catalyst, e.g. $TiCl_3$ is merely deposited on the surface of the predetermined shape. Examples of that would include preshaped particles, such as spheres which were manufactured to have the requisite shape and simply were unchanged in shape by the catalyst deposition process.

For the purpose of this invention, the term "support" in the context of "supported Ziegler catalyst" is meant to apply to inorganic salts of halogens which can be deposited or mixed with an active transition metal halide, e.g. $TiCl_3$ catalyst component by extensive grinding and milling of said inorganic halide salt support with a titanium chloride and/or deposition by conventional means of titanium halide from a hydrocarbon solvent onto the support material. Such titanium chloride can either be in the reduced state, e.g. $TiCl_3$, or it can be in the form of $TiCl_4$ which is subsequently reduced either during the milling step or subsequent to the milling step.

In any event, the resulting catalyst is a "supported Ziegler catalyst" component which forms one aspect of this invention. The supported titanium halide catalyst component may be extensively milled, ground or otherwise subjected to intense physical activity so that a wide range of particle size distribution is obtained, similar to that which is obtained when the $TiCl_3$ cocrystallized with aluminum chloride is ball milled.

Thus, it is the inventive scope of this application that Ziegler catalysts components which are "supported" by inorganic halogen salts can be treated with the fibrillatable polytetrafluoroethylene materials as described in the parent application and later herein to overcome the problem of fines, thereby narrowing the particle size distribution and/or increase the overall particle size of the catalyst component.

In the parent application, the production of Ziegler-type catalysts from $TiCl_4$ was described as being accomplished with several reducing agents, each of which produced a reduced $TiCl_3.nAlCl_3$ catalyst. The value of n varies with the reducing agent employed. When diethylaluminum chloride (DEAC) is used as the reducing agent, n will range from about 0.15 to about 0.50, and usually will be from 0.28 to 0.43, although theoretically n could be 0.5. Use of ethyl aluminum dichloride (EADC) results in a value of n from 0.3 to 1.0. The catalyst having a higher $AlCl_3$ content usually will have a lower catalyst activity (expressed as grams of polymer product per gram of catalyst employed). Use of an excess of reducing agent provides a catalyst of lower $AlCl_3$ content, but the particle size is smaller. Any suitable reduction technique now known to the art or subsequently discovered can be used, since the reduction step per se is not at the point of novelty.

It was described in the parent application that normally the reduction of $TiCl_4$ results in a $TiCl_3$ mixed with (alkyl) aluminum chlorides. This is true with most reducing agents, including aluminum, magnesium and/or titanium alkyl halides. An exception to this general principle is when a dialkyl aluminum halide is employed wherein the alkyl groups have from 2 carbon atoms, to about 5 carbon atoms the reduced products are primarily $TiCl_3$ and aluminum alkyl dichloride. Although the aluminum alkyl dichloride is capable of cocrystallization with the $TiCl_3$ and some of such cocrystallization takes place, the influence of diluents, third components and cocatalysts will often result in the removal of such aluminum alkyl dichloride, thus leaving a catalyst which is simply $TiCl_3$ alone.

For most purposes, the reduction step with aluminum triethyl for instance is so rapid that the resulting $TiCl_3$ is too small to be effectively utilized. If those small particles can be conveniently collected, the process of the instant invention would permit them to be agglomerated into larger catalyst masses which would be more suitable for commercial use.

However, when the $TiCl_3$ is on the support, i.e. the inorganic metal halide of the invention, such as for example, magnesium chloride or aluminum chloride that support provides sufficient structure and size so that even the $TiCl_3$ without being cocrystallized with the chloride can be effectively utilized. Thus, it is to be emphasized that the scope of the invention is not restricted to just $TiCl_3$ catalyst component which are supported on aluminum chloride, but is of scope adequate to comprise $TiCl_3$ which is supported upon other inorganic metal halide.

The invention is applicable to Ziegler catalysts of other transition metals such as vanadium, molybdenum, zirconium, and the like.

Surprisingly, aluminum chloride per se is not a particularly good support material. But it can be blended with other outstanding support materials in minor proportions, e.g., 0.1 to 40 weight percent, preferably 10 to 35 weight percent, and most preferably about 15 to 25 weight percent in order to modify the properties of the fundamental support material.

In general, the inorganic metal halide sales will be the metals of Groups IA, II A and B and IIIA of the Periodic System. Examples include aluminum, sodium, lithium, boron, gallium, beryllium, magnesium, zinc and cadmium.

Examples of suitable halides include $MgCl_2$, $MgBr_2$, $ZnCl_2$, $ZnBr_2$, NaCl, LiCl, $AlBr_3$, $AlI_3$, $CaCl_2$, $MgI_3$. Manganese chlorides are also utilizable.

During ballmilling, any of these inorganic support halides are capable of mixing with the titanium metal halide. This ability of mixing of titanium chloride with other halides of Groups II and III is known to the art and has been described at an early date, such as in U.S. Pat. No. 3,128,252.

It might be well to touch on the rationale of utilizing a support for titanium halides. Generally, the primary reason is to increase their activity since it could be made dependent on the surface area of the support for it was known that numerous supported materials had great activity. Such supported Ziegler catalysts are extensively used in ethylene polymerization processes.

Nevertheless, they have not been used in commercial polypropylene processes since even though they have high activity, the stereoregularity of the polypropylene produced has not been sufficiently high to permit competitive commercial operations. However, in recent years great strides have been made in overcoming the initial lack of stereoregularity.

The most attractive supported catalysts of the nature described herein have been obtained when the support material is activated by ballmilling. And the stereospecificity of the ballmilled supported catalyst is improved considerably by the presence of various highly critical third components, usually Lewis bases. Examples of patent literature which describe ballmilling of TiCl4 or TiCl3 with inorganic metal halide materials as supports include German Patent DT No. 223-0672, German Patent DT No. 223-0728, German Patent DT No. 223-0752, Belgian Pat. No. 805,264, German DT No. 223-5033, Japanese Pat. No. 4735076.

In general, the supported catalysts which are included within the scope of this invention are prepared by introducing a Group IA, II A and B or IIIA metal halide, e.g. magnesium chloride which is especially preferred, into a grinding apparatus, preferably a steel ball mill. Then TiCl4 in a ratio of about 0.05 to 1 based on moles of support material is introduced into the mill. Depending on whether the catalyst is to be used for polyethylene or polypropylene, a third component such as a Lewis base can be introduced into the mill. These materials are then ground together extensively for at least several hours until the supported catalyst is in either a relatively high state of activation or ready to be additionally reduced by a conventional reducing technique.

During this grinding process, very fine particles of supported catalyst are produced. These can be agglomerated and made into larger particles utilizing the technique of the invention as described hereinafter.

As pointed out in the parent application, the inventive concept applies to formulations of catalyst such as: $TiCl_m \cdot \chi AlR_n Cl_{3-n}$ where $\chi$ ranges between 0.01–1.5, m ranges between 2–3.5, and n ranges between 0.01–3, and R is an organic radical such as $CH_3$, $C_2H_5$, $C_3H_7$, etc., or other organic radical that normally is known and described by Mole and Jeffrey[1]; $MX_m \cdot \chi M'R_n X_{3-n}$ where M are metals of groups IIIB, IVB and VB of the periodic table, and M' are elements of Groups IA, IIA and IIIA of the periodic table, X is an element of groups VIA and VIIA of the periodic table, and m, $\chi$, and n vary as described above.

[1]. T. Mole and E. A. Jeffrey, "Organoaluminum Compounds", Elsevier, 1972.

It is to be emphasized that the catalyst formulations of the invention include those described at length which fall in the class of supported Ziegler catalyst on certain metal halides. And therefore, the catalyst which can be agglomerated utilizing the techniques described herein is not restricted to where the TiCl4 or TiCl3 is previously cocrystallized with only aluminum chloride. It also includes that whole class of catalysts where there is some interaction between the TiCl3 and a metal halide support.

It must also be additionally emphasized that a feature of this invention is that a previously cocrystallized TiCl3 aluminum chloride in very fine particle size will be ballmilled with an appropriate metal halide support material in order to disperse the finely divided cocrystallized particles on the support material. That resulting fine supported Ziegler catalyst is within the scope of this disclosure as a material which can be considerably improved by the agglomeration technique of the invention.

The PTFE of choice for this invention is obtained from E. I. duPont de Nemours & Co., Wilmington, Delaware 19898, as TEFLON K which is sold as a Particle Control Additive. It is a white powder Type 10 for use with the Ziegler-type catalysts, which are the preferred catalysts of this invention.

Very generally, the process used to obtain the enlarged catalytic component particles in a TEFLON K web comprises adding the TEFLON K to the supported catalyst component, mixing to form a homogeneous blend, and working this blend to form a fiber-web of TEFLON K having a particle size larger than 10 microns mean diameter and containing many catalyst fines having a diameter of less than 10 microns mean diameter.

For best results, TEFLON K, Type 10, should always be handled at or below room temperature (20° C.) so as to avoid further agglomeration of the PTFE particles. It should be spread as evenly as possible over the supported catalyst component to be treated, such as by sprinkling or by continuously adding the PTFE to a continuous plant process, thus avoiding the batch addition of the PTFE which increases the likelihood of further agglomeration of the PTFE.

A homogeneous mixture is necessary if the fiber-web is to pervade the entire catalyst component mixture. Dry mixtures can be prepared with most mixers but it should be noted that violent mixing such as with Waring Blendors, hammermills, or intensifier bars seems to initiate fibrillation and this is essential if tumbling is the only other working step.

Working is the application of a compressive shear to the mixture of TEFLON K and the supported catalyst component powder to be treated so that the fiber-web is developed within the mixture.

The working action applies a compressive shear to the mixture, the terms troweling and smearing are also descriptive of that kind of action, In the laboratory, this can be done with a spatula, a mortar/pestle or a small ball mill. In the plant, mullers, ball mills, slow-turning mixers or blenders, screw conveyors, spray driers and many more devices will do some or all of the fibrillation.

The working action just described must also be a slow action. Another consideration is that the mixture should be low in water content so that moisture does not serve as a lubricant to interfere with the working action.

One of the most important considerations is an adequate working temperature. The fiber-web will not form below 20° C. nor will it survive about 320° C. A common working temperature is 100° C. but with many materials it can be lower as determined by experimentation.

Any specific material to be treated will seem to have a minimum working temperature below which no obvious fibrillation occurs. Above this temperature there seem to be useful combinations of working conditions, dosage of TEFLON K and temperature. Stated a bit differently, within limits, working is faster and more effective with higher temperature,
higher dosages of TEFLON K, and
better working action.

Well worked mixtures with TEFLON K will show evidences of fibrillation such as an increased cohesiveness, an obvious change in texture, and material on a spatula will exhibit "whiskers" hanging over the edge. These "whiskers" seem to be web fragments made visible only by their trapped fines.

The first stage of fiber development, fiber initiation, is the most difficult and occasionally requires a different working action. A brief treatment of the mix in a hammermill, Waring Blendor or most any high-speed, intense mixer does this fiber initiation, presumably by elongating the TEFLON particles by impact. This kind of pre-treatment is optional though generally helpful to most succeeding working steps, but it is frequently essential ahead of working by tumbling only.

The dosage of TEFLON K will be higher in laboratory work than it will be later in the plant. The method of treatment will be a matter of choice but it should generally follow the method of plant production if possible, i.e., wet or dry treatment, etc. Start out with a high dosage such as $\frac{1}{2}$% or even 1% TEFLON K if this is the first trial. The dosages referred to are the weight percent of resin in the dry material being treated. Mix the powdered TEFLON K with the material in a Waring Blendor for a couple minutes. Stop the blender occasionally to get the powders down into the blades if necessary. Heat the mix to 100° C. and work as above.

After the first trial, conditions should be altered to produce the product desired.

A small laboratory ball mill can be a convenient working device. Fill the mill about 75–85% full of balls and mixture to minimize the cascading of the balls. The mill and contents can be preheated and will hold the heat well, or heat lamps may be used. This device makes work with toxic products relatively safe and easy since the material will be enclosed in the mill while it is being worked.

In addition to the previously mentioned equipment, spray dryers with either nozzles or spinning discs will do a good job of fibrillation. Additional working with a hot blending operation has proven beneficial to some treatments.

Exxtruders also can be effective working devices. Lodige blenders have done well also, but be aware that some large sizes have air pressurized bearings which levitate the mix by aeration so that it cannot be worked.

Plant scale production generally requires a lower dosage because the larger mass of material being handled adds to the compressive shear action. Since a higher dosage than necessary may lead to greater cohesion and reduced flowability, it is well to start with a half to a fourth of the laboratory dosage. Should the treatment produce a poorly flowing product, it may usually be blended with more product to give a desirable finished product.

It is sometimes desirable to prepare a concentrate of powder and TEFLON K at from, say, four to ten times the optimum dosage, and then blend it off to the desired final concentration in one massive dilution or by a gradual dilution. This is referred to as a master blend technique.

Fibril initiation is easier at these higher concentrations of TEFLON K. This method of treatment also permits an easier fibrillation of some difficult materials by starting the fibrillation at these higher concentrations. This is also a means for initiating fibrillation with temperature and working speed being short of optimum.

Care must be exercised to stop the mechanical working of the master mix or concentrate before it becomes too fibrillated. If not, further blending may become quite difficult.

An interesting advantage of the master blend method is that the total working time can frequently be less than with the normal working procedure. Time can be saved since fiber initiation is much more rapid at the higher loading of TEFLON K in the master mix. Also, much less time is needed to blend to the final dilution than to have worked the whole charge from the start.

This master blend method also permits a flexibility in the use of working machinery by using the equipment with the best working action for the master mix and then using less efficient equipment for blending it off.

It is possible to change particles of TEFLON K particle control additive into fibers by passing a proper mixture through a region of turbulent gas flow. This has been accomplished by use of orifice plates, Venturi tubes, etc., and it has been done with various addition methods, including spraying a fine mist of diluted TEFLON K, Type 20 into the hot gas stream which was carrying the powder to be processed. The Melt-Blowing process of Exxon Research could be used for mixing.

The Invention is further illustrated by the following examples:

EXAMPLE 1

$TiCl_3.0.33AlCl_3$ produced by the reduction of $TiCl_4$ with aluminum and then dry ballmilled was obtained from the Stauffer Chemical Company as $TiCl_3.AA$ or $TiCl_3.A$ and was ground or ballmilled in the presence of dry TEFLON K. During the ballmilling the catalyst component surface area was increased with concomitant increase in catalyst activity. There was a total absence of poisoning of the catalyst by the inert TEFLON K. The catalyst including the fines which normally lead to a wide particle size distribution are in this process, held by submicron strands of Teflon. The polymer made with these catalyst particles in combination with diethyl aluminum chloride cocatalyst by conventional polymerization techniques have a narrow particle size distribution in those instances where the catalyst system has a narrow particle size distribution and a wide particle size distribution where the catalyst had a wide particle size distribution.

$TiCl_3.0.33AlCl_3$ that has been ballmilled and otherwise treated to improve its activity and stereospecificity, e.g., ether/$TiCl_4$ treatments, was also ballmilled with dry TEFLON K to agglomerate the catalyst particles in a web of Teflon fibers. The results are summarized in Tables I and II.

Table I clearly illustrates that the particle size of the catalyst is increased. It is further clear that by increasing the ballmilling time the particle size distribution increases while the overall particle size decreases. Nevertheless, it is clearly demonstrated that the overall particle size of the catalyst component prepared in accordance with this invention is significantly increased over the conventional titanium halide Ziegler catalyst components.

Table II clearly illustrates that the polymers made in accordance with this invention are obtained with an overall particle size significantly larger than the polymers obtained by polymerizing propylene in the presence of conventional catalysts.

It is also understood that materials other than Teflon or special formulations of polytetrafluoroethylene will serve to entrap the catalyst particles as disclosed here, as well as other polymeric materials that fibrillate on mechanical treatment as described above. Thus polymeric materials such as polyethylene, chlorinated Teflons and other polyolefins at elevated temperatures may form polymer webs.

It is furthermore clearly envisioned that polytetrafluoroethylene treated with other materials such as Lewis bases or Lewis acids can be used in the above described treatment, thereby accomplishing two or more objectives, agglomerating catalyst particles and activating the catalyst.

All above descriptions are thought to be unique in that they modify the nature of the catalyst, which in turn modifies the nature of the product made from such a catalyst.

TABLE I

CATALYSTS TREATED WITH TEFLON K (TYPE 10)

| Experiment No. | Catalyst Type | Teflon Wt % | Ballmilled, Minutes | Catalyst Appearance Shape | Particle Size Distribution | Size mm |
|---|---|---|---|---|---|---|
| (4375-) | | | | | | |
| 28-0(Control) | TiCl$_3$AA | — | — | Irregular | Wide | 1 × 10$^{-3}$ |
| 29-0(Control) | TiCl$_3$A | — | — | Irregular | Wide | 1 × 10$^{-1}$ |
| 28-1A | TiCl$_3$AA | 1 | 15 | Plates | Narrow | 5 |
| 28-1B | " | 0.125 | 15 | Powder | Wide | 1 × 10$^{-3}$ |
| 28-2B | " | 0.1 | Ground | Clumped | Medium | 2 |
| 28-2C | " | 0.01 | " | " | " | 2 |
| 29-1 | " | 2 | 15 | Plates | Narrow | 10 |
| 29-1B | " | 2 | 30 | " | " | 3 |
| 29-2 | " | 2 | 60 | Powder | Medium | 0.1 |
| 29-2B | " | 2 | 120 | " | Wide | <0.1 |
| 29-3 | " | 1 | 15 | Plates | Medium | 3 |
| 29-3B | " | 1 | 30 | Powder | " | 0.1 |
| 29-4 | " | 1 | 60 | Powder | Wide | <0.1 |
| 29-5 | " | 2 | 60 | " | " | 0.1 |
| 29-9 | TiCl$_3$A | 0.5 | 60 | Powder | Wide | <0.1 |
| 29-9B | " | 1.0 | 75 | " | " | 0.1 |
| 29-10 | " | 1.0 | 120 | " | " | <0.1 |
| 29-11 | " | 0.5 | 240 | " | " | |
| 32-1 | TiCl$_3$* (a) | 0.2 | 120 | Plates | Medium | 2 |
| 32-1B | " (a) | 0.2 | 240 | Powder | | |
| 32-2 | STP (b) | 1.0 | 15 | Plates | Medium | 2–5 |
| 32-3 | STP (c) | 1.0 | 15 | " | " | 2–5 |

| Experiment No. | Catalyst Type | Teflon Wt % | Ballmilled, Minutes | Catalyst Properties Settle in C$_7$, Seconds | Efficiency, w/w | Wax % | C$_7$-Insol. % | Polymer + 200 Mesh, Wt % |
|---|---|---|---|---|---|---|---|---|
| (4375-) | | | | | | | | |
| 28-0(Control) | TiCl$_3$AA | — | — | 180 | 41 | 2.0 | 94.3 | 12 |
| 29-0(Control) | TiCl$_3$A | — | — | | 30.4 | | 91.9 | |
| 28-1A | TiCl$_3$AA | 1 | 15 | 1 | | | | |
| 28-1B | " | 0.125 | 15 | 10 | 41 | 2.6 | 94.6 | 14 |
| 28-2B | " | 0.1 | Ground | 1 | | | | |
| 28-2C | " | 0.01 | " | 1 | | | | |
| 29-1 | " | 2 | 15 | 1 | | | | |
| 29-1B | " | 2 | 30 | 1 | | | | |
| 29-2 | " | 2 | 60 | 5 | | | | |
| 29-2B | " | 2 | 120 | 60 | | | | |
| 29-3 | " | 1 | 15 | 1 | | | | |
| 29-3B | " | 1 | 30 | 5 | | | | |
| 29-4 | " | 1 | 60 | >120 | | | | |
| 29-5 | " | 2 | 60 | 5 | 34 | 1.9 | 95.3 | 1.2 |
| 29-9 | TiCl$_3$A | 0.5 | 60 | | | | | |
| 29-9B | " | 1.0 | 75 | 5 | | | | |
| 29-10 | " | 1.0 | 120 | 120 | 31.9 | 5 | 92.1 | 7.5 |
| 29-11 | " | 0.5 | 240 | | | | | |
| 32-1 | TiCl$_3$* (a) | 0.2 | 120 | 5 | | | | |
| 32-1B | " (a) | 0.2 | 240 | 5 | | | | |
| 32-2 | STP (b) | 1.0 | 15 | <5 | | | | |
| 32-3 | STP (c) | 1.0 | 15 | <5 | | | | |

(b) STP catalyst activated with 0.96 (n-C$_5$H$_{11}$)$_2$O and 2.2 TiCl$_4$
(c) STP catalyst activated with 0.83 (i-C$_5$H$_{11}$)$_2$O and 2.5 TiCl$_4$
(a) Experimental catalyst having extremely fine particle size (0.5 to 30 microns)

TABLE II

POLYPROPYLENE PARTICLE SIZE DISTRIBUTIONS

| Catalyst No. Identification | (1) 3915-73-9A TiCl$_3$AA | (1) 4375-28-0 TiCl$_3$AA | 4375-28-1B TiCl$_3$AAF.1 | 4375-29-5 TiCl$_3$FF.2 | (2) 4375-29-10 TiCl$_3$AF.1 |
|---|---|---|---|---|---|
| Particle Size Distribution | | | | | |
| 20 mesh, wt. % | 0.7 | 0.2 | 3.5 | 16.4 | 4.6 |
| 60 mesh, wt. % | 18.9 | 30.4 | 42.0 | 65.9 | 44.5 |
| 100 mesh, wt. % | 29.1 | 30.9 | 23.8 | 10.9 | 20.9 |
| 200 mesh, wt. % | 30.5 | 26.7 | 16.8 | 5.5 | 22.4 |
| 325 mesh, wt. % | 9.5 | 7.8 | 8.0 | 0.9 | 7.1 |
| +325 mesh, wt. % | 11.1 | 4.0 | 5.9 | 0.4 | 0.5 |

TABLE II-continued

POLYPROPYLENE PARTICLE SIZE DISTRIBUTIONS

| Catalyst No. Identification | (1) 3915-73-9A TiCl$_3$AA | (1) 4375-28-0 TiCl$_3$AA | 4375-28-1B TiCl$_3$AAF.1 | 4375-29-5 TiCl$_3$FF.2 | (2) 4375-29-10 TiCl$_3$AF.1 |
|---|---|---|---|---|---|
| loss mesh, wt. % | 0.2 | 0.0 | 0.0 | 0.0 | 0.0 |

(1) Untreated commercial catalyst
(2) Catalyst not previously ballmilled
Note:
Number = particles still on mesh The catalyst in Experiment Nos. 32-2 and 32-3 comprises a TiCl$_4$ which has been reduced in a diluent with an aluminum alkyl chloride and subsequently treated with the indicated amount of ether, followed by a treatment with the indicated amount of TiCl$_4$. This catalyst is exceptionally active and it is highly advantageous to be able to form the relatively large active particles of the invention.

It can be seen from an examination of the data in these TABLES I and II that dramatic changes in the particle size of the catalyst and the polymer resulting therefrom can be accomplished without appreciable loss of catalyst efficiency.

EXAMPLE 2

Twelve grams of anhydrous magnesium chloride and 1 gram of TiCl$_4$ is milled in a vibration mill containing 80 steel balls having a 12 mm diameter for a time of 16 hours. The surface area of the resulting supported catalyst is about 8 m$^2$/gm and the catalyst has a wide particle size distribution with a substantial quantity of fines, e.g. materials having a particle size of 10 microns or less of mean particle diameter.

This material is then ballmilled in the presence of a polytetrafluoroethylene material obtained from duPont under the tradename TEFLON K.

The catalyst is held by submicron strands of the TEFLON K material so as to increase the overall effective size of the material. The supported catalyst component has a much narrower particle size distribution when worked for a short period of time and a wide particle size distribution when worked for a longer period of time, i.e. greater than about 60 minutes.

EXAMPLE 3

The process of Example 2 is repeated exactly except that the TEFLON K is introduced at the beginning of the ballmilling process rather than at the end. The particle size distribution obtained is essentially the same.

EXAMPLE 4

The process of Example 2 is repeated except that the titanium compound is the TiCl$_3$.0.33AlCl$_3$ of Example 1.

EXAMPLE 5

The procedure of Example 4 is repeated exactly except that the TEFLON K is introduced at the inception of the grinding/ballmilling, rather than at the end of such process.

In the above examples, the TEFLON K referred to, when used as a solid, is available from the E. I. duPont Company, Fluorocarbons Division, as Type 10. It is free flowing white powder with the following characteristics:

Average Particle Size—500 Microns
Bulk Density—450 g/l
Intrinsic Density—2.2 g/ml
Surface Area—10 M$^2$/g
Crystallinity—95%
Melting Range—320°-340° C. (608°-644° F.)
Solubility—Insoluble in all common solvents
Chemical Inertness—Stable to all common reagents at ordinary temperatures. Reacts with alkali metals and fluorine or reactive agents yielding fluorine.

What is claimed is:

1. Supported Ziegler transition metal halide catalyst component comprising a plurality of agglomerated particles having a mean particle diameter of from about 10 up to about 1,000 microns, each agglomerated particle comprising a web of polytetrafluoroethylene submicroscopic fibers entangled with supported transition metal halide Ziegler catalyst particles, said support material being a Group IA, IIA, and B or IIIA metal halide.

2. The supported Ziegler transition metal halide catalyst component of claim 1 wherein the mean particle diameter is from about 20 to about 1,000 microns.

3. The supported Ziegler transition metal halide component of claim 1 wherein the mean particle diameter is from about 20 to about 50 microns.

4. The supported Ziegler transition metal halide catalyst component of claim 1 wherein said transition metal is titanium.

5. The supported Ziegler transition metal halide catalyst component of claim 1 wherein said support is magnesium chloride.

6. The supported Ziegler transition metal halide catalyst component of claim 1 wherein said support is zinc chloride.

7. The supported Ziegler transition metal halide catalyst component of claim 1 wherein said support material is a mixture of at least two or more of said Group IIA, and B or IIIA metal halides.

8. The supported Ziegler transition metal halide catalyst component of claim 1 wherein said support material is a magnesium halide and said transitional metal halide is titanium halide.

9. The supported Ziegler transition metal halide catalyst component of claim 1 wherein said support material is a magnesium chloride and said transitional metal halide is titanium halide.

10. The supported Ziegler transition metal halide catalyst component of claim 8 wherein said titanium halide is mixed with AlCl$_3$.

11. The supported Ziegler transition metal halide catalyst component of claim 1 wherein said support material and said transition metal halide are mixed with Lewis acids and/or Lewis bases prior to mixing with PTFE.

12. A process for increasing the mean particle size of a supported titanium halide-containing catalyst component comprising grinding supported titanium halide in the presence of polytetrafluoroethylene for a period of time sufficient to form a plurality of individual web entrapped catalyst agglomerates.

13. The process of claim 12 wherein the grinding is performed for about 1 hour.

14. The process of claim 12 wherein the supported titanium halide comprises $TiCl_4$ supported on $MgCl_2$.

15. A catalyst system for the polymerization of α-olefins said catalyst system comprising an organo aluminum catalyst component and the transition metal halide catalyst component of claim 1.

16. A catalyst system for the polymerization of α-olefins said catalyst system comprising an organo aluminum catalyst component and the transition metal halide catalyst component of claim 2.

17. A catalyst system for the polymerization of α-olefins said catalyst system comprising an organo aluminum catalyst component and the transition metal halide catalyst component of claim 3.

18. A catalyst system for the polymerization of α-olefins said catalyst system comprising an organo aluminum catalyst component and the transition metal halide catalyst component of claim 4.

19. A catalyst system for the polymerization of α-olefins said catalyst system comprising an organo aluminum catalyst component and the transition metal halide catalyst component of claim 5.

20. A catalyst system for the polymerization of α-olefins said catalyst system comprising an organo aluminum catalyst component and the transition metal halide catalyst component of claim 6.

21. A catalyst system for the polymerization of α-olefins said catalyst system comprising an organo aluminum catalyst component and the transition metal halide catalyst component of claim 7.

22. A catalyst system for the polymerization of α-olefins said catalyst system comprising an organo aluminum catalyst component and the transition metal halide catalyst component of claim 8.

23. A catalyst system for the polymerization of α-olefins said catalyst system comprising an organo aluminum catalyst component and the transition metal halide catalyst component of claim 9.

24. A catalyst system for the polymerization of α-olefins said catalyst system comprising an organo aluminum catalyst component and the transition metal halide catalyst component of claim 10.

* * * * *